(12) United States Patent
Taniguchi et al.

(10) Patent No.: US 11,842,861 B2
(45) Date of Patent: Dec. 12, 2023

(54) METHOD OF MANUFACTURING SWITCH CAP, SWITCH CAP, AND SWITCH DEVICE

(71) Applicant: NISSHA CO., LTD., Kyoto (JP)

(72) Inventors: Chuzo Taniguchi, Kyoto (JP); Eiji Kawashima, Kyoto (JP); Jun Sasaki, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 0 days.

(21) Appl. No.: 17/995,342

(22) PCT Filed: Mar. 22, 2021

(86) PCT No.: PCT/JP2021/011638
§ 371 (c)(1),
(2) Date: Oct. 3, 2022

(87) PCT Pub. No.: WO2021/205854
PCT Pub. Date: Oct. 14, 2021

(65) Prior Publication Data
US 2023/0123719 A1 Apr. 20, 2023

(30) Foreign Application Priority Data
Apr. 6, 2020 (JP) ................................ 2020-068519

(51) Int. Cl.
*H01H 13/14* (2006.01)
*H01H 11/00* (2006.01)
(Continued)

(52) U.S. Cl.
CPC ............ *H01H 13/14* (2013.01); *H01H 11/00* (2013.01); *H01H 13/20* (2013.01); *B60Q 9/00* (2013.01); *B62D 1/046* (2013.01)

(58) Field of Classification Search
CPC ........ H01H 13/14; H01H 11/00; H01H 13/20; H01H 3/12; H01H 13/02; H01H 13/023;
(Continued)

(56) References Cited

U.S. PATENT DOCUMENTS

| | | | |
|---|---|---|---|
| 8,941,585 B2 * | 1/2015 | Minamitani | G06F 3/03547 345/184 |
| 10,312,032 B1 * | 6/2019 | Chu | H01H 13/04 |
| 10,592,004 B1 * | 3/2020 | Sun | H01H 13/83 |

FOREIGN PATENT DOCUMENTS

| | | | |
|---|---|---|---|
| JP | 2005157437 A | 6/2005 | |
| JP | 2008059913 A | 3/2008 | |

(Continued)

*Primary Examiner* — Lheiren Mae A Caroc
(74) *Attorney, Agent, or Firm* — Alleman Hall Creasman & Tuttle LLP

(57) ABSTRACT

A switch cap for a switch device that can reduce a pressing error of a switch is provided. A three-dimensional first cap main body moves by a force applied to a first abutting portion from a finger which is an operator. A first sensor is disposed in the first cap main body, and detects abutting or approach of the finger to the first abutting portion. A first transmission member is fixed to the inside of the first cap main body, and moves together with the first cap main body for first switching to transmit movement of the first cap main body to a push button which is a predetermined location of a switch device. A first sensor is formed in a flexible printed circuit board (FPC) disposed in the first cap main body, and the FPC is fixed by the first transmission member and the first cap main body.

9 Claims, 14 Drawing Sheets

(51) Int. Cl.
*H01H 13/20* (2006.01)
*B60Q 9/00* (2006.01)
*B62D 1/04* (2006.01)

(58) Field of Classification Search
CPC ...... H01H 13/705; H01H 13/83; H01H 13/84; H01H 13/85; H01H 2215/03; H01H 2215/044; H01H 2219/036; H01H 2229/044; H01H 2229/046; H01H 2229/047; H01H 2229/048; Y10T 29/49105; B60Q 9/00; B62D 1/046
See application file for complete search history.

(56) References Cited

FOREIGN PATENT DOCUMENTS

| | | | |
|---|---|---|---|
| JP | 2010123470 A | 6/2010 | |
| JP | 2012068724 A | 4/2012 | |
| JP | 2016143252 A | 8/2016 | |

\* cited by examiner

METHOD OF MANUFACTURING SWITCH CAP, SWITCH CAP, AND SWITCH DEVICE

TECHNICAL FIELD

The present invention relates to a method of manufacturing a switch cap including a three-dimensional cap main body, a switch cap, and a switch device.

BACKGROUND ART

As disclosed in PTL 1 (JP 2012-68724 A), an input device of the related art includes a combination of a sensor sheet and a contact substrate. In the input device disclosed in PTL 1, the sensor sheet in which a keytop is disposed in a two-dimensional lattice shape and a contact substrate having a metal dome disposed in a two-dimensional lattice shape are used in order to achieve a reduction in thickness and improve workability at the time of assembly.

CITATION LIST

Patent Literature

PTL 1: JP 2012-68724 A

SUMMARY OF INVENTION

Technical Problem

Since the input device disclosed in PTL 1 uses a sheet, the degree of freedom in key arrangement is lower than that of a push button in which keys are arranged separately one by one.

An object of the present invention is to provide a switch device that has good workability at the time of assembly and a high degree of freedom in key arrangement and can reduce pressing errors of a switch, and a switch cap suitable for such a switch device.

Solution to Problem

Some aspects will be described below as means for solving the problems. These aspects can be combined arbitrarily as necessary.

A method of manufacturing a switch cap according to the aspect of the present invention is a method of manufacturing a switch cap attached to a switch device that performs predetermined switching, the method including (a) molding a transmission member by first injection molding using a first model, the transmission member moving together with a cap main body for the switching to transmit the movement of the cap main body to a predetermined location of the switch device, and (b) molding a second model into the first model to perform second injection molding, and molding the three-dimensional cap main body having an abutting portion that an operator abuts for the switching and moving by a force applied to the abutting portion from the operator. The method includes (c) setting a flexible printed circuit board (FPC) at a predetermined location of the first model before the step of (a) or before the step of (b), the flexible printed circuit board including a sensor that detects abutting or approach of the operator to the abutting portion, and fixing the flexible printed circuit board by the cap main body and the transmission member so that the sensor is disposed at a predetermined location of the abutting portion by the step of (a), the step of (b), and the step of (c).

In the method of manufacturing the switch cap configured in this manner, the flexible printed circuit board is fixed by the cap main body and the transmission member, and thus it is possible to reduce labor such as assembling for attaching the sensor to the inside of the cap main body and to improve workability at the time of assembling the switch device. The three-dimensional cap main body can be disposed together with the sensor, and thus it is possible to prevent a decrease in the degree of freedom of disposition of the switch cap. Utilizing the detection of abutting or approach of the operator to the abutting portion by the sensor of the switch cap can reduce pressing errors of a switch.

A switch cap according to an aspect of the present invention is a switch cap attached to a switch device that performs predetermined switching, the switch cap including a three-dimensional cap main body having an abutting portion that an operator abuts for the switching and moving by a force applied to the abutting portion from the operator, a sensor disposed in the cap main body and detecting abutting or approach of the operator to the abutting portion, and a transmission member fixed to an inside of the cap main body and moving together with the cap main body for the switching to transmit the movement of the cap main body to a predetermined location of the switch device, in which the sensor is formed in a flexible printed circuit board disposed in the cap main body, the flexible printed circuit board is fixed by the transmission member and the cap main body, and a lead portion of the flexible printed circuit board is disposed along an inner surface of the body of the cap main body.

In the switch cap configured in this manner, the flexible printed circuit board is fixed by the cap main body and the transmission member, and thus the connection of the sensor such as connection of the flexible printed circuit board to a connector is facilitated, and it is possible to improve workability at the time of assembling the switch cap. It is possible to dispose the three-dimensional cap main body together with the sensor and to prevent the disposition of the switch cap from being restricted by the position of the sensor. Utilizing the detection of abutting or approach of the operator to the abutting portion by the sensor of the switch cap can reduce pressing errors of a switch.

The switch cap described above may be configured such that the flexible printed circuit board includes a light-emitting component that emits light indicating the cap main body. The switch cap configured in this manner can easily associate, for example, the detection of abutting or approach of the operator to the abutting portion with light emission of the light-emitting component, thereby making it easier to construct a configuration for reducing pressing errors of a switch.

The switch cap described above may be configured to include a first capacitance sensor and a second capacitance sensor that are disposed side by side along the abutting portion and are capable of detecting a moving direction of the operator as the sensor. For example, the switch cap configured in this manner can perform predetermined switching in consideration of the moving direction of the operator, thereby making it easier to increase variations of switching.

A switch device according to an aspect of the present invention includes a first switch cap and a second switch cap, a switch unit performing first switching in accordance with movement of the first switch cap and performing second switching in accordance with movement of the second switch cap, a notification unit giving a notification of states of the first switch cap and the second switch cap by using light, vibration, or sound, and a controller connected to the first switch cap, the second switch cap, and the switch unit and controlling the notification unit, in which the first switch cap includes a three-dimensional first cap main body having a first abutting portion that an operator abuts for the first switching, and a first sensor disposed in the first cap main body, the second switch cap includes a three-dimensional second cap main body having a second abutting portion that the operator abuts for the second switching, and a second sensor disposed in the second cap main body, the first cap main body and second cap main body are configured to respectively move by forces applied to the first abutting portion and the second abutting portion from the operator, the first sensor and the second sensor respectively transmit a first detection signal and a second detection signal related to detection of abutting or approach of the operator to the first abutting portion and the second abutting portion to the controller, and the controller causes the notification unit to give a notification of which one of the first abutting portion and the second abutting portion the operator is abutting or approaching by a distinguishable light color or blinking, a difference in vibration, or a difference in sound, based on the first detection signal and the second detection signal.

In the switch device configured in this manner, utilizing the detection of abutting or approach of the operator to the first abutting portion and the second abutting portion by the first sensor and the second sensor can reduce pressing errors of the first switch cap and the second switch cap such as, for example, pressing the second switch cap when attempting to press the first switch cap.

In the above-mentioned switch device, the first switch cap may include a first transmission member that moves together with the first cap main body for the first switching to transmit the movement of the first cap main body to a predetermined location of the switch unit, the second switch cap may include a second transmission member that moves together with the second cap main body for the second switching to transmit the movement of the second cap main body to the predetermined location of the switch unit, and the controller may cause the switch unit to perform the first switching by the first transmission member transmitting the movement of the first cap main body to the predetermined location of the switch unit after the notification given by the notification unit when the operator has abutted or approached the first abutting portion, cause the switch unit to perform the second switching by the second transmission member transmitting the movement of the second cap main body to the predetermined location of the switch unit after the notification given by the notification unit when the operator has abutted or approached the second abutting portion, and cause the switch unit not to perform the first switching and the second switching even when the first transmission member and the second transmission member transmit the movement of the first cap main body and the second cap main body to the predetermined location of the switch unit before the notification given by the notification unit.

In the switch device configured in this manner, the first switching and the second switching are not performed even when the first cap main body and the second cap main body are pressed to be moved before the notification given by the notification unit, and thus it is possible to prevent errors of the first switching and the second switching.

A switch device according to another aspect of the present invention includes a housing, a switch cap fitted into the housing, a switch unit performing switching in accordance with movement of the switch cap, and a controller connected to the switch unit, in which the switch cap includes an abutting portion that an operator abuts for the switching, and includes a three-dimensional cap main body that moves by a force applied to the abutting portion from the operator, an operator sensor that is disposed in the cap main body and detects abutting or approach of the operator to the abutting portion, and a transmission member that is fixed to an inside of the cap main body and moves together with the cap main body for the switching to transmit the movement of the cap main body to a predetermined location of the switch unit, the housing and the switch cap are provided with an operation detection sensor detecting a moving speed or a movement distance of the cap main body, and the controller is connected to the operator sensor and the operation detection sensor, and performs the detection of abutting or approach of the operator to the abutting portion and the detection of the moving speed or the movement distance of the cap main body when the switching of the switch unit is performed.

The switch device configured in this manner can increase variations in switching by using at least one of the moving speed and the moving distance of the cap main body.

A switch device according to another aspect of the present invention includes a housing, a switch cap fitted into the housing, a switch unit performing first switching in accordance with movement of the switch cap, and a controller connected to the switch unit, in which the switch cap includes an abutting portion that an operator abuts for the first switching, and includes a three-dimensional cap main body moving by a force applied to the abutting portion from the operator, and a sensor that is disposed in the cap main body and detects abutting or approach of the operator to the abutting portion, the controller is connected to the sensor and performs second switching different from the first switching by the abutting or approach of the operator to the abutting portion, the controller receives a detection signal indicating the abutting or approach of the operator to the abutting portion by the second switching, the controller stops the first switching at a timing when the detection signal has been received, and the controller allows switching of the first switching when a predetermined period of time elapses from the timing at when the detection signal has been received.

The switch device configured in this manner can increase variations in switching by combining the first switching and the second switching.

Advantageous Effects of Invention

A switch device and a switch cap according to the present invention have good workability at the time of assembly and a high degree of freedom in key arrangement and can reduce pressing errors of a switch. In addition, a method of manufacturing a switch cap according to the present invention is suitable for providing the switch cap described above.

DESCRIPTION OF EMBODIMENTS

Hereinafter, a switch device according to an embodiment of the present invention and a switch cap used in the switch device will be described.

(1) Overall Configuration

Figure 1:
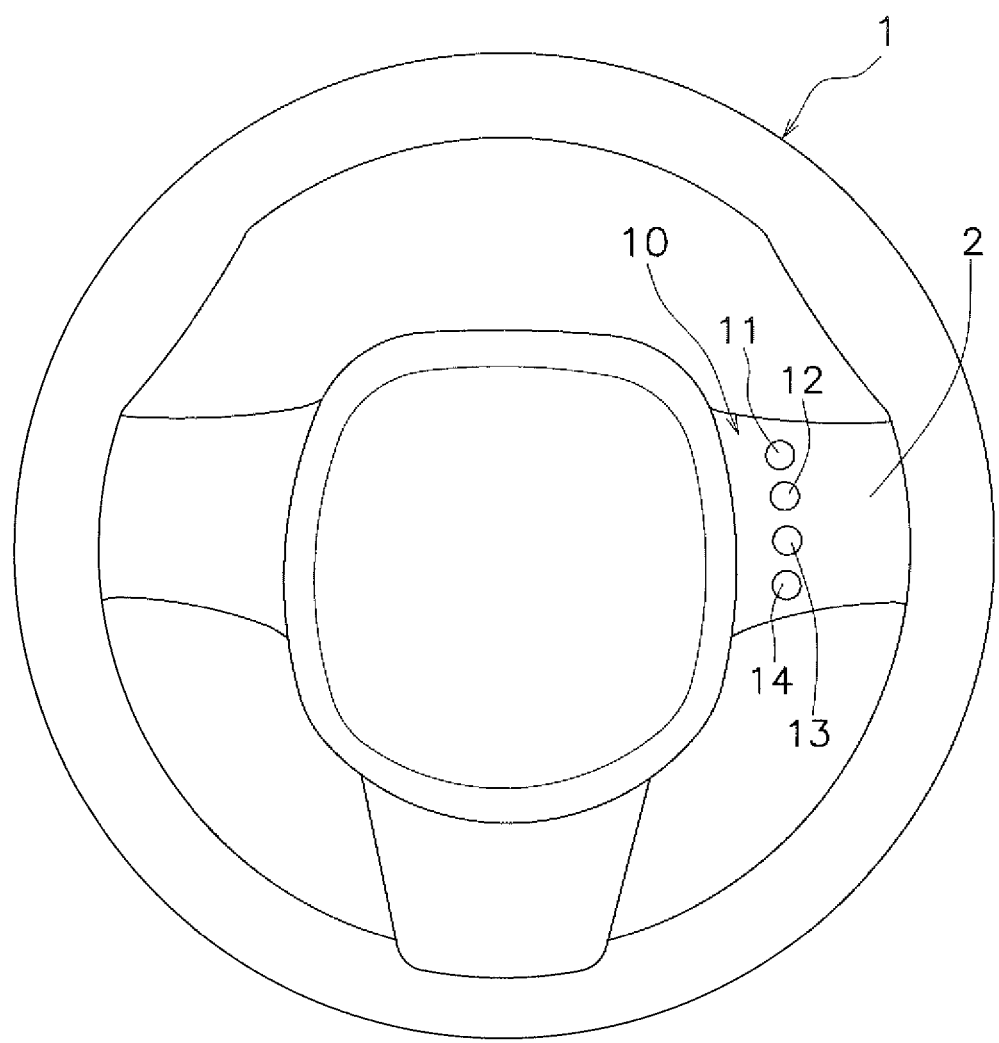
FIG. 1 is a schematic front view of a steering wheel to which a switch device according to an embodiment is applied.

FIG. 1 schematically illustrates a steering wheel 1 of an automobile. Four switch caps, that is, a first switch cap 11, a second switch cap 12, a third switch cap 13, and a fourth switch cap 14, are attached to the steering wheel 1 of the automobile. The first switch cap 11 to the fourth switch cap 14 are switch caps that are used for, for example, switching of changeover between a high beam and a low beam, switching between driving and non-driving of a wiper, switching between driving and non-driving of a washer, switching of changeover of a center meter, and the like. For this switching, the first switch cap 11 to the fourth switch cap 14 may be operated during operation of the automobile. In a case where the switch caps are operated during the operation of the automobile, it is preferable to select a necessary switch without viewing the first switch cap 11 to the fourth switch cap 14 and operate a necessary switch cap from among the first switch cap 11 to the fourth switch cap 14. The first switch cap 11 to the fourth switch cap 14 are provided in the switch device 10. In other words, the first switch cap 11 to the fourth switch cap 14 are switch caps attached to the switch device 10 that performs predetermined switching.

Figure 2:
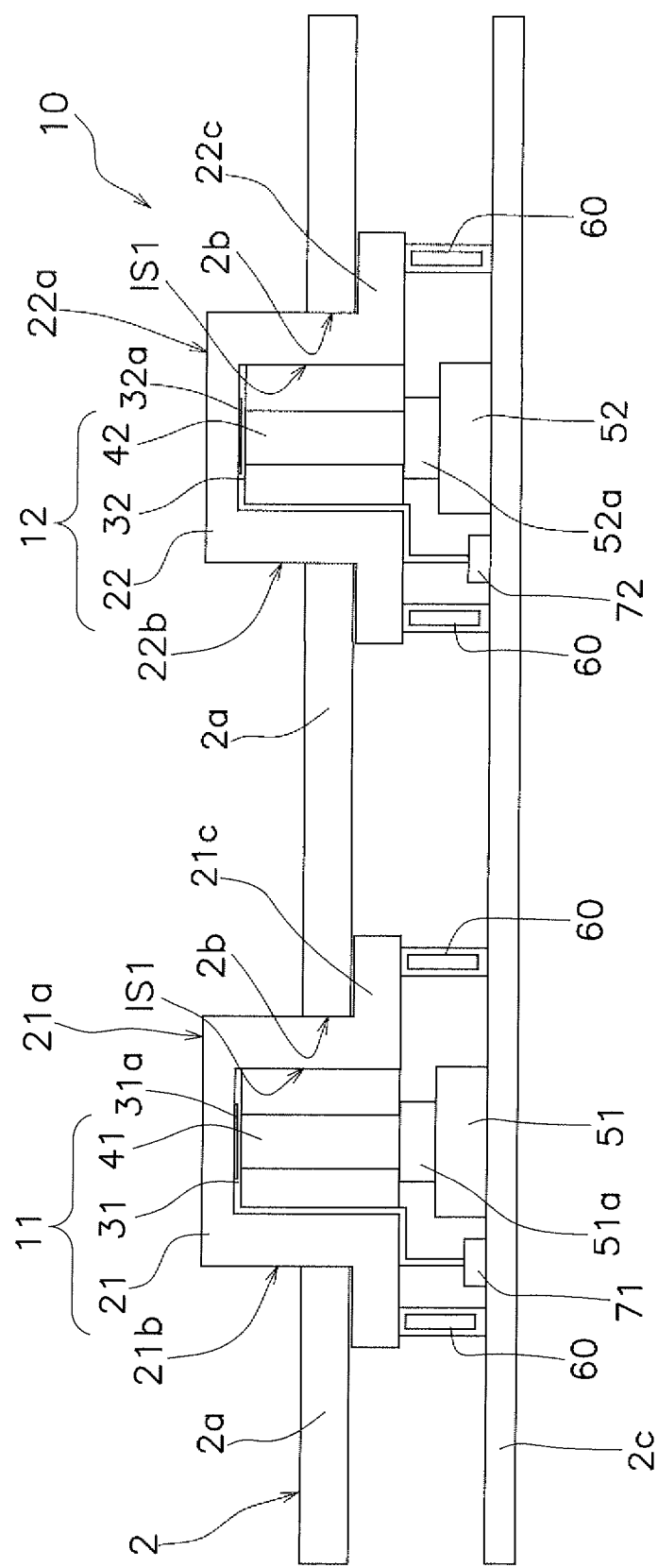
FIG. 2 is a schematic cross-sectional view illustrating a configuration of a first switch cap and a second switch cap constituting the switch device.
Figure 3:
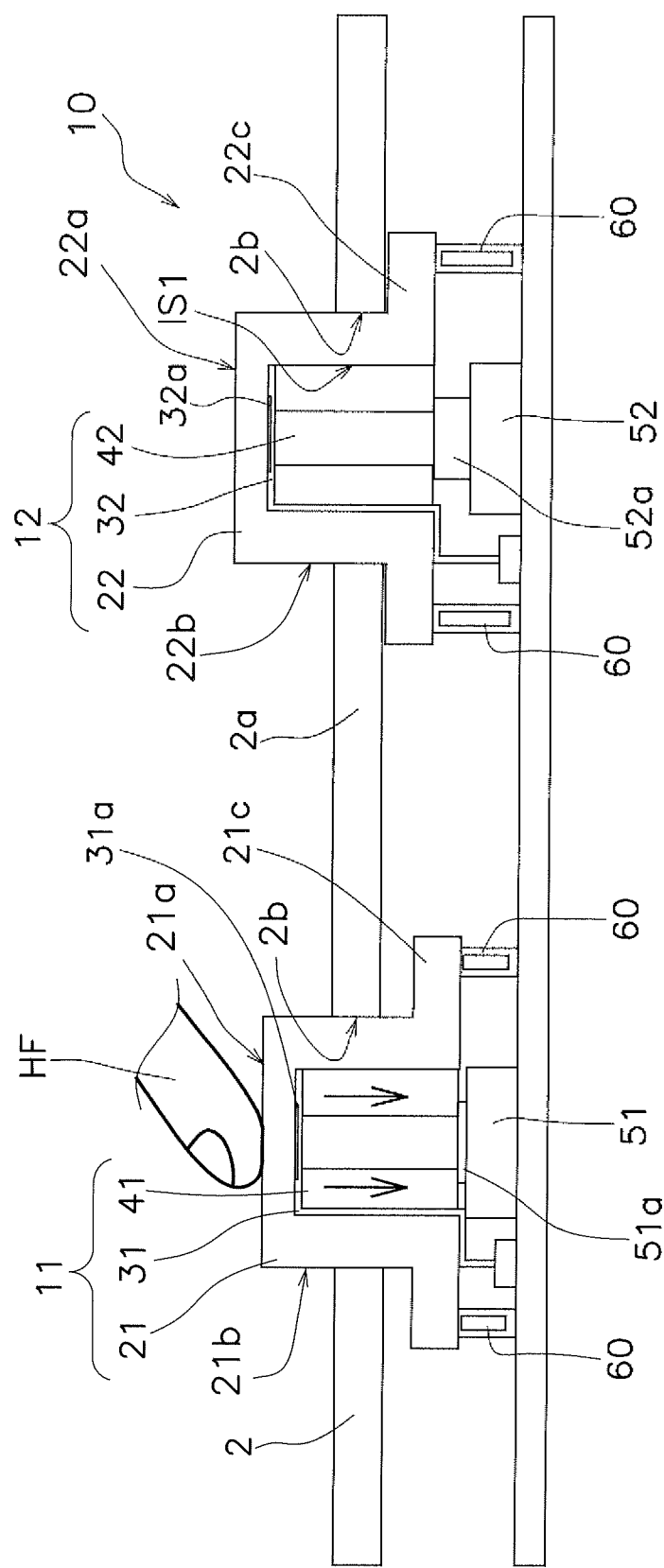
FIG. 3 is a schematic cross-sectional view illustrating movement of the first switch cap.
Figure 4:
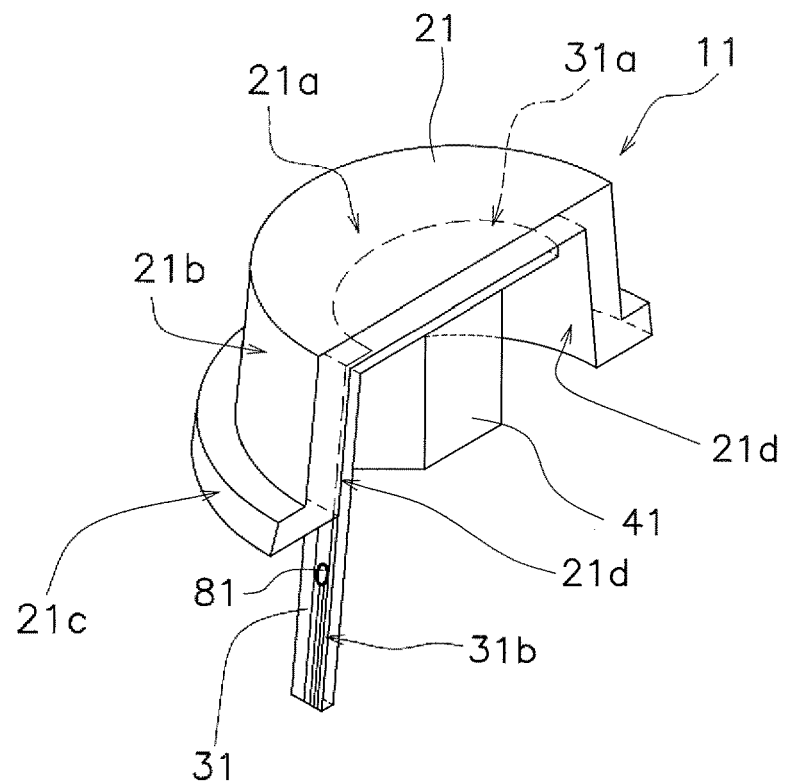
FIG. 4 is a partially cut perspective view of the first switch cap.
Figure 5:
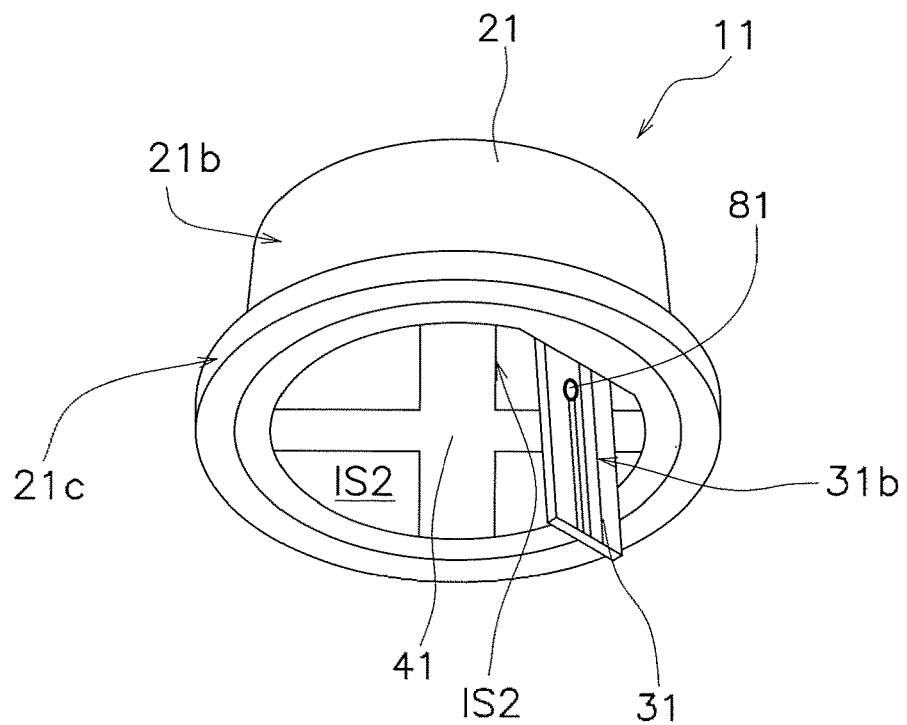
FIG. 5 is a perspective view of the first switch cap from the lower front side.
Figure 6:
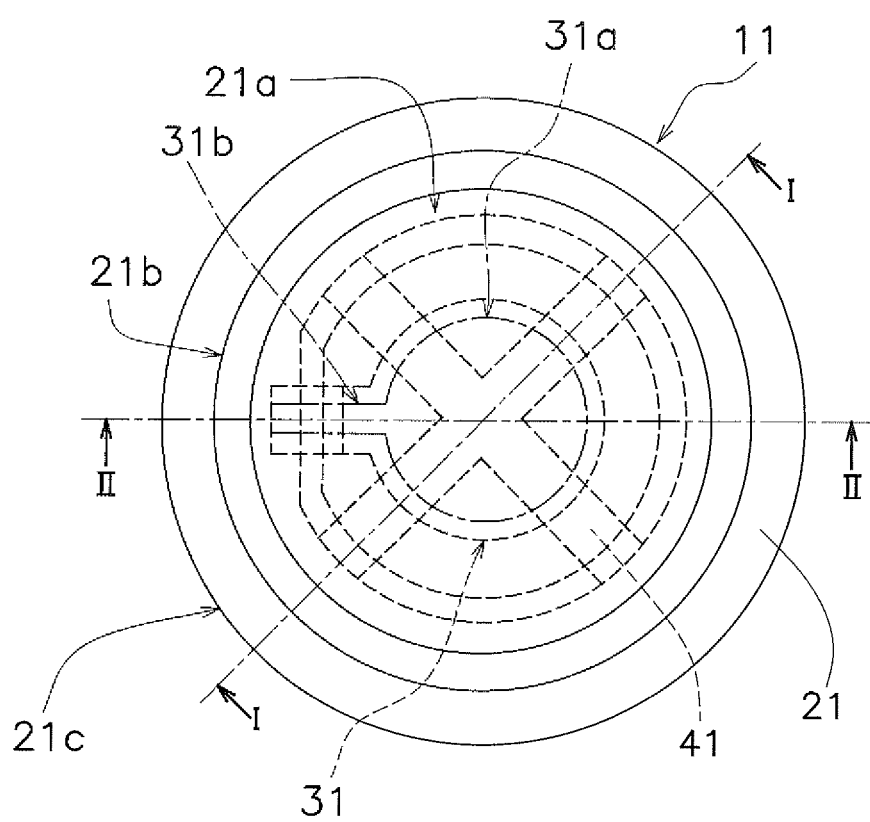
FIG. 6 is a plan view of the first switch cap.

FIGS. 2 and 3 schematically illustrate cross-sectional structures of the locations of the first switch cap 11 and the second switch cap 12 of the switch device 10. The structures of the locations of the third switch cap 13 and the fourth switch cap 14 can also be configured in the same manner as the structures of the locations of the first switch cap 11 and the second switch cap 12, and thus description of the cross-sectional structures of the locations of the third switch cap 13 and the fourth switch cap 14 is omitted here. In addition, FIG. 4 illustrates one of two separate portions obtained by cutting the first switch cap 11. FIG. 5 illustrates a state where the first switch cap 11 is viewed obliquely from below. In addition, FIG. 6 illustrates the shape of the first switch cap 11 in a plan view.

The first switch cap 11 includes a first cap main body 21, a first sensor 31a, and a first transmission member 41. In addition, the second switch cap 12 includes a second cap main body 22, a second sensor 32a, and a second transmission member 42. The first cap main body 21, the second cap main body 22, the first transmission member 41, and the second transmission member 42 can be formed of, for example, a thermoplastic resin or a thermoplastic elastomer. Examples of the thermoplastic resin include an acrylonitrile-butadiene-styrene resin (ABS), an acrylic resin (PMMA), a polycarbonate resin (PC), a polyethylene naphthalate resin (PEN), a polypropylene resin (PP), a composite material of a polycarbonate resin and an ABS resin, and the like. Thermoplastic elastomers include a thermoplastic polyurethane elastomer (TPU).

The first switch cap 11 and the second switch cap 12 have a three-dimensional shape. The first switch cap 11 includes a first abutting portion 21a that a finger HF of a person which is an operator abuts for first switching. The second switch cap 12 includes a second abutting portion 22a that the finger HF abuts for second switching. The first switch cap 11 and the second switch cap 12 move by forces respectively applied to the first abutting portion 21a and the second abutting portion 22a from the finger HF. For example, the first switch cap 11 changes from the state illustrated in FIG. 2 to the state illustrated in FIG. 3 by being pressed by the finger HF.

As illustrated in FIG. 2, the switch device 10 includes an elastic body 60 between a set of the first switch cap 11 and the second switch cap 12 and a support substrate 2c of a support portion 2. The elastic body 60 contracts when a force is applied to the first abutting portion 21a and the second abutting portion 22a from the finger HF. For example, FIG. 3 illustrates the elastic body 60 that is contracted by a force applied from the finger HF to the first abutting portion 21a. When the force applied to the first abutting portion 21a disappears from the state in which the elastic body 60 is contracted by the force applied from the first abutting portion 21a as illustrated in FIG. 3, the elastic body 60 extends as illustrated in FIG. 2. The elastic body 60 is, for example, a spring or a rubber.

Additionally, the switch device 10 includes tact switches 51 and 52 fixed to the support substrate 2c. The tact switches 51 and 52 are included in the switch unit 50 (see FIG. 7). The first transmission member 41 and the second transmission member 42 are in contact with a push button 51a of the tact switch 51 and a push button 52a of the tact switch 52, respectively. The push buttons 51a and 52a are positioned at predetermined locations of the switch device 10.

Additionally, connectors 71 and 72 are attached to the support substrate 2c. The connectors 71 and 72 are connected to a controller 90 to be described below. Flexible printed circuit boards 31 and 32 are connected to the connectors 71 and 72.

In the first cap main body 21 and the second cap main body 22, the first transmission member 41 and the second transmission member 42 are fixed, respectively. The first transmission member 41 and the second transmission member 42 move together with the first cap main body 21 and the second cap main body 22 for first switching and second switching of the switch device 10, respectively. The first transmission member 41 and the second transmission member 42 respectively move together with the first cap main body 21 and the second cap main body 22, and transmit movement of the first cap main body 21 and the second cap main body 22 to the push buttons 51a and 52a which are positioned at predetermined locations of the switch device 10. The movement of the first cap main body 21 and the second cap main body 22 is an operation in which the first cap main body 21 and the second cap main body 22 approach the support substrate 2c by a force applied from the finger HF to the first abutting portion 21a and the second abutting portion 22a, respectively. In other words, the first transmission member 41 and the second transmission member 42 respectively transmitting the movement of the first cap main body 21 and the second cap main body 22 to the push buttons 51a and 52a of the switch device 10 means that the first transmission member 41 and the second transmission member 42 push the push buttons 51a and 52a, respectively. The first transmission member 41 and the second transmission member 42 respectively push the push buttons 51a and 52a, and thus an electrical conduction state is set between terminals of the tact switches 51 and 52.

The first sensor 31a and the second sensor 32a are disposed in the first cap main body 21 and the second cap main body 22, respectively. The first sensor 31a detects abutting or approach of the finger HF to the first abutting portion 21a, and the second sensor 32a detects abutting or approach of the finger HF to the second abutting portion 22a.

Figure 7:
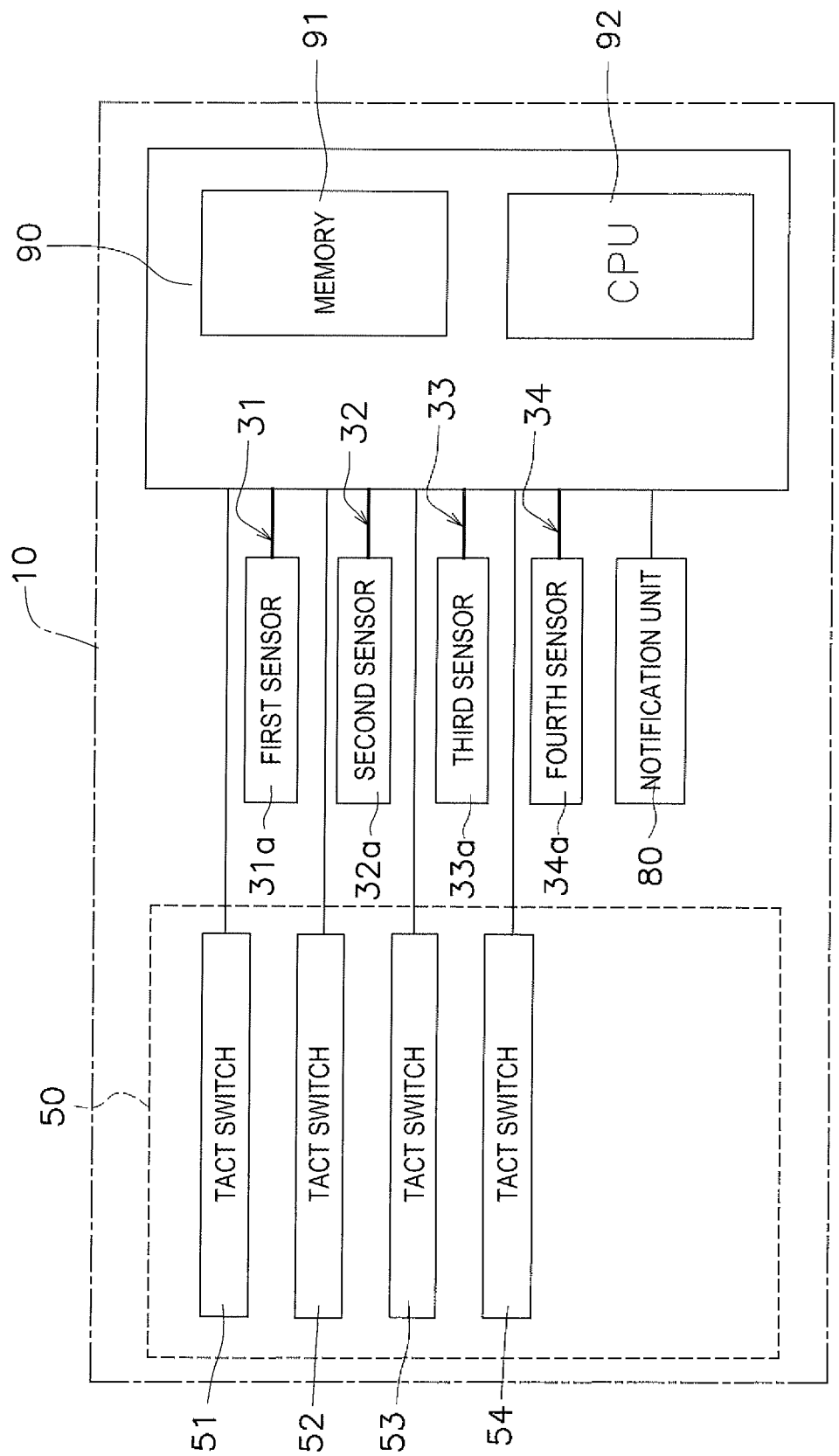
FIG. 7 is a block diagram illustrating an outline of a control system of the switch device.

FIG. 7 illustrates an outline of the controller 90 of the switch device 10 and a configuration related to control performed by the controller 90. The switch device 10 includes tact switches 51 to 54 as a switch unit 50. The switch device 10 includes the first sensor 31a, the second sensor 32a, a third sensor 33a, and a fourth sensor 34a disposed in the first switch cap 11 to the fourth switch cap 14. The first sensor 31a and the second sensor 32a are mounted on the flexible printed circuit boards 31 and 32, respectively, as illustrated in FIG. 2. Note that the flexible printed circuit boards may be referred to simply as FPCs. The first sensor 31a to the fourth sensor 34a are connected to the controller 90 by FPCs 31 to 34. Further, the switch device 10 includes a notification unit 80.

Hereinafter, the switch device 10 will be described focusing on the first switch cap 11 and the second switch cap 12. The switch unit 50 performs first switching in accordance with the movement of the first switch cap 11 and performs second switching in accordance with the movement of the second switch cap 12. Here, description is given on the assumption that the first switching is, for example, changeover between driving and non-driving of the wiper, and the second switching is, for example, changeover between driving and non-driving of the washer. The notification unit 80 gives a notification of information regarding a relationship between the first switch cap 11, the second switch cap 12, and the finger HF. Here, information indicating whether the finger HF is abutting on the first abutting portion 21a of the first switch cap 11 and information indicating whether the finger HF is abutting on the second abutting portion 22a of the second switch cap 12 are set to be the information regarding the relationship between the first switch cap 11, the second switch cap 12, and the finger HF.

The controller 90 controls the notification unit 80. For this reason, a first detection signal related to the detection of abutting of the finger HF on the first abutting portion 21a is transmitted to the controller 90 from the first sensor 31a, and a second detection signal related to the detection of abutting of the finger HF on the second abutting portion 22a is transmitted to the controller 90 from the second sensor 32a. Here, a case where the first detection signal and the second detection signal are related to the detection of abutting of the finger HF on the first abutting portion 21a and the second abutting portion 22a will be described. However, by changing the settings of the first sensor 31a and the second sensor 32a, the first detection signal and the second detection signal can also be changed to detection signals related to the detection of approach of the finger HF to the first abutting portion 21a and the second abutting portion 22a.

The controller 90 controls the notification unit 80 on the basis of the first detection signal or the second detection signal received from the first sensor 31a or the second sensor 32a. The controller 90 causes the notification unit 80 to give a notification of which one of the first abutting portion 21a of the first switch cap 11 and the second abutting portion 22a of the second switch cap 12 the finger HF abuts on. The notification unit 80 gives a notification of which one of the first abutting portion 21a and the second abutting portion 22a the finger HF abuts on, using at least one of, for example, light, vibration, and a sound. Specifically, in a case where the first sensor 31a detects abutting of the finger HF, the notification unit 80 generates vibration indicating the first switch cap 11 on the basis of, for example, an instruction received from the controller 90. For example, a first frequency of vibration indicating the first switch cap 11 and a second frequency of vibration indicating the second switch cap 12 are set differently. A driver operating the steering wheel 1 can confirm that the switch cap the driver attempts to press is the first switch cap 11 by feeling the vibration of the first frequency in the finger HF, without viewing his or her hand.

(2) Detailed Configuration (2-1) Cap Main Body

The first cap main body 21 and the second cap main body 22 of the first switch cap 11 and the second switch cap 12 include cylindrical bodies 21b and 22b, respectively. The bodies 21b and 22b are fitted into a round hole 2b formed in a front face plate 2a of the support portion 2 of the steering wheel 1. One-side ends of the cylindrical bodies 21b and 22b are closed by the circular first abutting portion 21a and second abutting portion 22a, respectively. Accordingly, a cylindrical internal space IS1 is formed in the first switch cap 11 and the second switch cap 12. The first cap main body 21 and the second cap main body 22 respectively include annular flange portions 21c and 22c each having an outer circumference that is larger than that of the round hole 2b that extends outward from the bodies 21b and 22b in the support portion 2. The flange portions 21c and 22c are configured to hit the front face plate 2a so that the first cap main body 21 and the second cap main body 22 are not removed from the support portion 2.

Here, the first cap main body 21 and the second cap main body 22 are configured to have a circular shape in a plan view. However, the shapes of the first cap main body 21 and the second cap main body 22 in a plan view are not limited to a circular shape, and may be other shapes, for example, a quadrilateral shape or a long circular shape.

(2-2) Transmission Member

The first transmission member 41 and the second transmission member 42 of the first switch cap 11 and the second switch cap 12 are configured to have a cross shape in a plan view. However, the shapes of the first transmission member 41 and the second transmission member 42 are not limited to a cross shape in a plan view. The first transmission member 41 and the second transmission member 42 may have other shapes, for example, a columnar shape, a shape in which a rib protrudes from a side surface of a cylinder, and a shape in which a rib is formed in a cylindrical shape.

Note that it is preferable that the first transmission member 41 and the second transmission member 42 have a shape in which the transmission members can be fixed to the inner surfaces of the first cap main body 21 and the second cap main body 22. For this reason, it is preferable that the first transmission member 41 and the second transmission member 42 are configured to be bonded to the back surfaces of the circular first abutting portion 21a and second abutting portion 22a by being formed to be larger than the FPCs 31 and 32. Furthermore, it is preferable that the first transmission member 41 and the second transmission member 42 have a shape in which the transmission members are inscribed in the bodies 21b and 22b of the first cap main body 21 and the second cap main body 22. Additionally, it is preferable that the first transmission member 41 and the second transmission member 42 have a shape in which the FPCs 31 and 32 can be fixed to the inner surfaces of the first cap main body 21 and the second cap main body 22, respectively, in a sandwiched manner. Specifically, as described in the present embodiment, a configuration in which the FPCs 31 and 32 are sandwiched between the back surface of the first cap main body 21 and the upper surface of the first transmission member 41 and between the back surface of the second cap main body 22 and the upper surface of the second transmission member 42.

The first transmission member 41 and the second transmission member 42 may be used as, for example, light guides that guide light of a light-emitting component (for example, a light-emitting diode) provided in the switch device 10. The first transmission member 41 and the second transmission member 42 are formed of a transparent or translucent resin when used as light guides.

(2-3) Sensor

As illustrated by an alternating dotted-dashed line in FIG. 6, the first sensor 31a has a shape corresponding to the shape of the first abutting portion 21a. The first sensor 31a has a substantially circular shape in accordance with the circular first abutting portion 21a. A portion of the first sensor 31a is connected to a lead portion 31b in which a wiring line of the FPC 31 is led. The lead portion 31b is bonded to an inner surface 21d of the body 21b of the first cap main body 21 (see FIGS. 4 and 5). The lead portion 31b of the FPC 31 passes through a cap inner space IS2. However, the lead portion 31b is fixed to the inner surface 21d of the first cap main body 21, and a position relative to the first cap main body 21 is fixed, and thus connection with the connector 71 is facilitated. The same applies to the FPC 32 that is fixed in the second cap main body 22.

The first sensor 31a and the second sensor 32a are capacitance sensors. Here, capacitance sensors as the first sensor 31a and the second sensor 32a for detecting abutting or approach of the finger HF to the first abutting portion 21a and the second abutting portion 22a are used. However, a sensor that detects abutting or approach of an operator to an abutting portion is not limited to the capacitance sensor. For example, in a case where the operator is a metal rod, a proximity sensor can be used as a sensor that detects abutting or approach to the abutting portion. The first sensor 31a and the second sensor 32a respectively transmit a first detection signal and a second detection signal related to abutting or approach of the finger HF to the first abutting portion 21a and the second abutting portion 22a to the controller 90. Similarly, the third sensor 33a and the fourth sensor 34a respectively transmit a third detection signal and a fourth detection signal related to abutting or approach of the finger HF to the abutting portion of the third switch cap 13 and the abutting portion of the fourth switch cap 14 to the controller 90.

The FPC 31 is constituted by an insulating base film, which is thin and soft, and a conductive layer formed in the base film. Examples of a material used in the base film include a polyethylene terephthalate resin (PET), a polycarbonate resin (PC), a polyimide resin (PI), a cycloolefin polymer resin (COP), a composite film of an acrylic resin (PMMA) and a polycarbonate resin (PC), a liquid crystal polymer resin (LCP), and a thermoplastic polyurethane elastomer (TPU). Examples of a material of the conductive layer include metals such as copper or silver, PEDOT (poly(3,4-ethylenedioxythiophene)), and carbon nanotubes (CNT). Materials using a metal such as copper or silver include, for example, conductive paste, copper foil, and metal mesh.

(2-4) Switch Unit, Notification Unit, and Controller

The switch unit 50 illustrated in FIG. 7 is constituted by four tact switches 51 to 54. As the tact switches 51 to 54, switches of the related art can be used. Here, a case where the switch unit 50 is constituted by the tact switches 51 to 54 has been described. However, a switch constituting the switch unit 50 is not limited to the tact switch. The switch unit 50 can also be constituted by, for example, a membrane switch or a paddle switch.

The notification unit 80 is configured to give a notification of an abutting portion that an operator (here, the finger HF) is abutting or approaching by a distinguishable light color or blinking, a difference in vibration, or a difference in sound. For example, in a case where the finger HF is abutting on the first abutting portion 21a, the notification unit 80 causes the first switch cap 11 to the fourth switch cap 14 to emit red light. For this reason, the notification unit 80 includes, for example, a light-emitting diode that emits red light. Furthermore, the notification unit 80 causes the first switch cap 11 to the fourth switch cap 14 to emit blue light in a case where the finger HF is abutting on the second abutting portion 22a, causes the first switch cap 11 to the fourth switch cap 14 to emit yellow light in a case where the finger HF is abutting on the third switch cap 13, and causes the first switch cap 11 to the fourth switch cap 14 to emit white light in a case where the finger HF is abutting on the fourth switch cap 14. In this manner, the notification unit 80 may include a plurality of diodes having different light emission colors. Further, the notification unit 80 may notify an abutting portion by blinking the diodes. For example, four different types of light emission periods of the diodes are provided, and the notification unit 80 may be configured to give a notification by making the light emission period and the abutting portion correspond to each other. The notification unit 80 gives a notification of abutting or approach to the first abutting portion 21a, for example, at a shortest light emission period. For example, as illustrated in FIG. 4, a light-emitting diode 81 may be attached to the FPC 31. The light-emitting diode 81 may be disposed in first cap main body 21. With such a configuration, the first cap main body 21 may be configured as a transparent or translucent body so that light of the light-emitting diode 81 passes therethrough. In such a case, the first transmission member 41 may be formed of a transparent resin so that the first transmission member 41 functions as a light guide.

In addition, the notification unit 80 may distinctively give a notification of an abutting portion that the finger HF is abutting or approaching by a difference in vibration. For this reason, the notification unit 80 may include, for example, a vibration motor. For example, four different types of vibration frequencies are provided, and the notification unit 80 may be configured to give a notification by making the vibration frequency and the abutting portion correspond to each other. The notification unit 80 gives a notification of abutting or approach to the first abutting portion 21a, for example, at the lowest rotation speed of the vibration motor. In addition, the notification unit 80 may distinctively give a notification of an abutting portion that the finger HF is abutting or approaching by a difference in sound. For this reason, the notification unit 80 may include, for example, a speaker. For example, four different types of frequencies of a beep sound are provided, and the notification unit 80 may be configured to give a notification by making the frequency of the beep sound and the abutting portion correspond to each other. The notification unit 80 gives a notification of abutting or approach to the first abutting portion 21a, for example, using a beam sound at the lowest frequency.

As illustrated in FIG. 7, the controller 90 is connected to the first sensor 31a of the first switch cap 11, the second sensor 32a of the second switch cap 12, the third sensor 33a of the third switch cap 13, and the fourth sensor 34a of the fourth switch cap 14. In addition, the controller 90 is connected to the switch unit 50 and the notification unit 80. The controller 90 causes the notification unit 80 to give a notification of which one of the abutting portions of the first switch cap 11 to the fourth switch cap 14 the finger HF is abutting or approaching by a distinguishable light color or blinking, a difference in vibration, or a difference in sound, on the basis of the first detection signal to the fourth detection signal. For this reason, the controller 90 is configured to include, for example, a memory 91 and a CPU 92. The memory 91 stores a program necessary for controlling the controller 90. The CPU 92 controls the notification unit 80 and the switch unit 50 on the basis of the first detection signal to the fourth detection signal in accordance with the program stored in the memory 91.

(2-5) Operations of Switch Device

Operations of the switch device 10 will be described using a case where the first sensor 31a to the fourth sensor 34a of the switch device 10 are configured to detect abutting on an abutting portion as an example.

Figure 8:
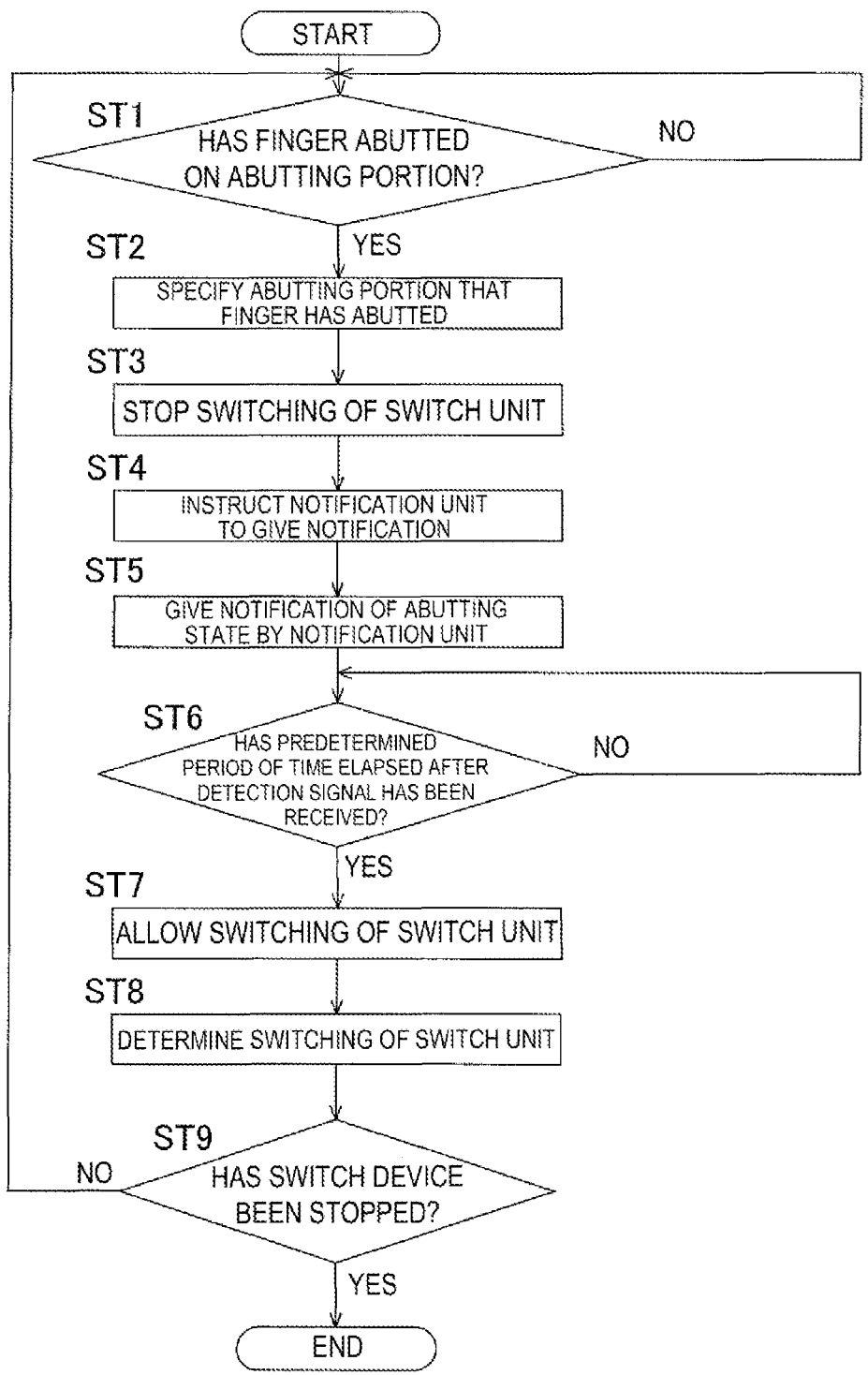
FIG. 8 is a flowchart illustrating operations of the switch device.

As illustrated in FIG. 8, the controller 90 is waiting for the first sensor 31a to the fourth sensor 34a to receive the first detection signal to the fourth detection signal indicating abutting (step ST1). Here, it is assumed that the finger HF has abutted on the first abutting portion 21a of the first switch cap 11.

The controller 90 receives the first detection signal indicating that the finger HF has abutted on the first abutting portion 21a from the first sensor 31a. The controller 90 specifies that the finger HF has abutted on the first abutting portion 21a on the basis of the first detection signal (step ST2).

The controller 90 cancels switching of a switch from the tact switch 51 even when the first transmission member 41 presses the push button 51a of the tact switch 51 from the switch unit 50 after a timing at which the first detection signal is received (step ST3). In other words, switching by the switch unit 50 is stopped at the timing at which the first detection signal is received.

Next, the controller 90 instructs the notification unit 80 to give a notification that the finger HF has abutted on the first abutting portion 21a of the first switch cap 11 (step ST4).

When the notification unit 80 receives an instruction from the controller 90 and causes, for example, notification means included in the notification unit 80, for example, a red light-emitting diode to emit light to cause a user to know that the finger HF is touching the first switch cap 11 (step ST5). In other words, this is when the notification unit 80 gives a notification of an abutting state of the finger HF.

For example, the controller 90 starts counting an internal timer from a timing at which the first detection signal is received to measure the elapse of a predetermined period of time. The controller 90 waits for a predetermined period of time to elapse from the timing at which the first detection signal is received (NO in step ST6).

When the predetermined period of time elapses from the timing at which the first detection signal is received (Yes in step ST6), the controller 90 allows switching of the switch unit (step ST7).

When the push button 51a of the tact switch 51 is pressed by the first transmission member 41 after the predetermined period of time has elapsed from the timing at which the first detection signal is received, the controller 90 determines that first switching has been input from the switch unit 50 by the tact switch 51 (step ST8). For example, when the first switching is driving of a washer of an automobile, the washer can be driven at the point in time of step ST7. It is assumed that, for example, the driver of the automobile erroneously presses the first switch cap 11 strongly when the driver attempts to press the second switch cap 12 for driving the wiper. Even in such a case, when the driver stops pressing the first switch cap 11 and presses the second switch cap 12 again until a predetermined period of time elapses after the driver views the light emission of the red light-emitting diode, the driving of the wiper is performed correctly instead of the driving of the washer, under the control of the controller 90.

When the switch device 10 is not stopped (NO in step ST9), the switch device 10 repeats the operations from step ST1 to step ST8 described above until the switch device 10 is stopped (Yes in step ST9).

(3) Method of Manufacturing Switch Cap

Here, a method of manufacturing the first switch cap 11 through so-called two-color molding using two injection cylinders and two sets of molds is described.

Figure 9:
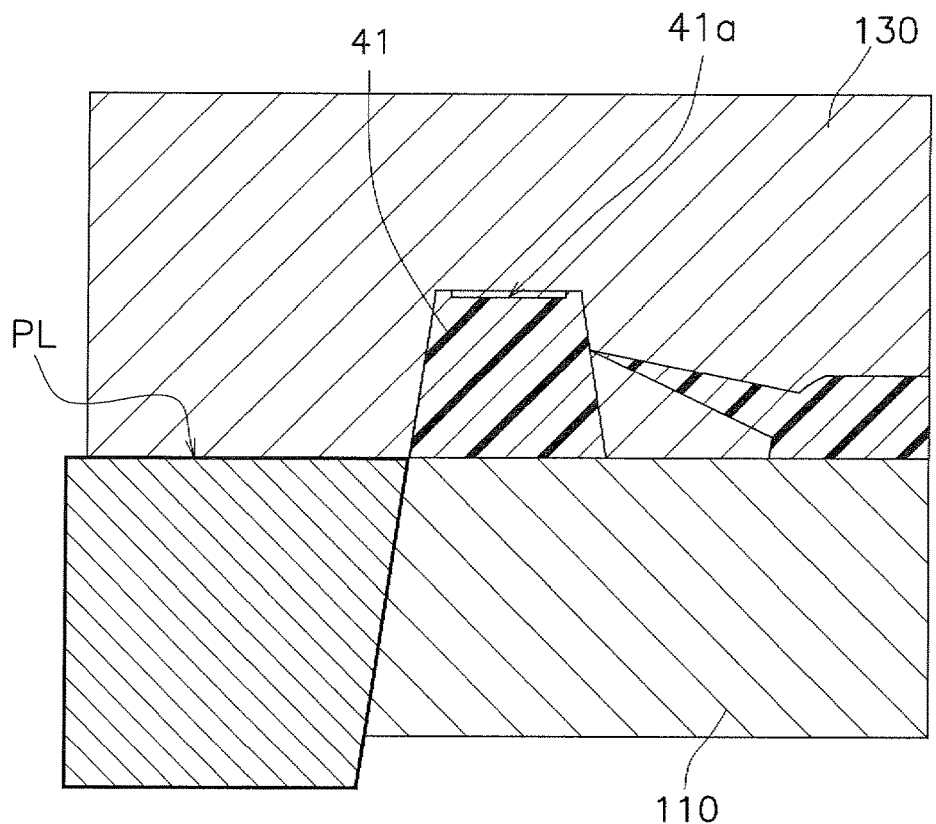
FIG. 9 is a schematic cross-sectional view illustrating first injection molding using a first model and a third model.

First injection molding is performed using a primary mold including a first model 110 and a third model 130 illustrated in FIG. 9, and the first transmission member 41 of the first switch cap 11 is molded by a primary molding resin ejected in the first injection molding. FIG. 9 illustrates a cross-section of the first transmission member 41 when cut in the direction of a line I-I in FIG. 6. At this time, the primary molding resin is injected into a cavity formed by the first model 110 and the third model 130 by using a tunnel gate. In FIG. 9, a parting line PL is positioned on the lower surface of the first transmission member 41. At this time, a recessed portion 41a for positioning the FPC 31 is formed in the first transmission member 41.

Figure 10:
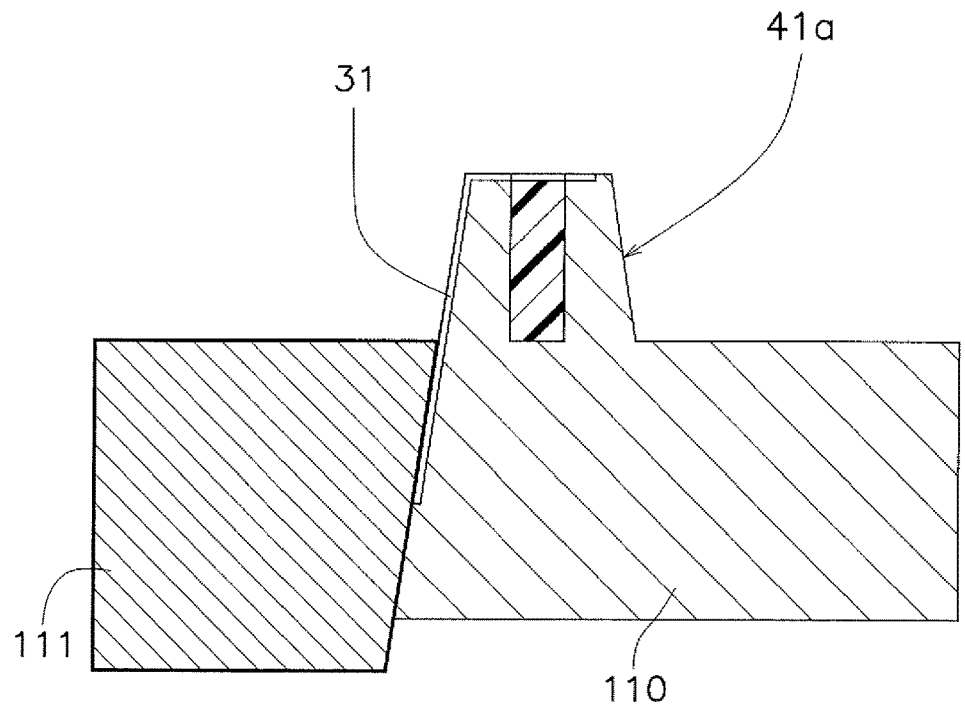
FIG. 10 is a schematic cross-sectional view illustrating setting of an FPC.
Figure 11:
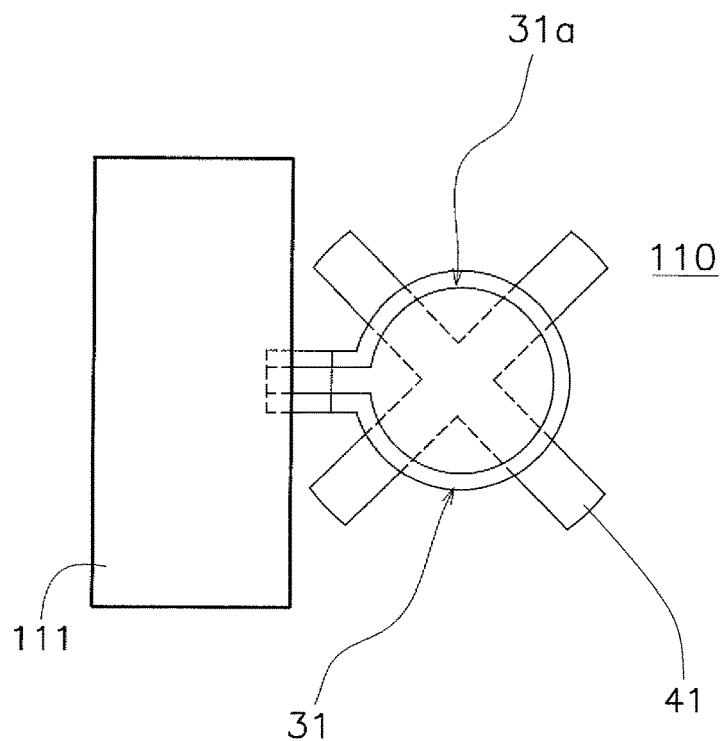
FIG. 11 is a plan view illustrating a relationship between an FPC block and an FPC.

In the next step, the third model 130 is removed from the first model 110, and the FPC 31 is set before secondary molding. When the FPC 31 is set, an FPC block 111 illustrated in FIGS. 10 and 11 slides, and thus a space for inserting the FPC 31 is formed next to the FPC block 111 of the first model 110. The FPC 31 is drawn into the first model 110 by the movement of the FPC block 111. FIG. 10 illustrates a cross-section of the first transmission member 41 when cut in the direction of a line II-II in FIG. 6.

Figure 12:
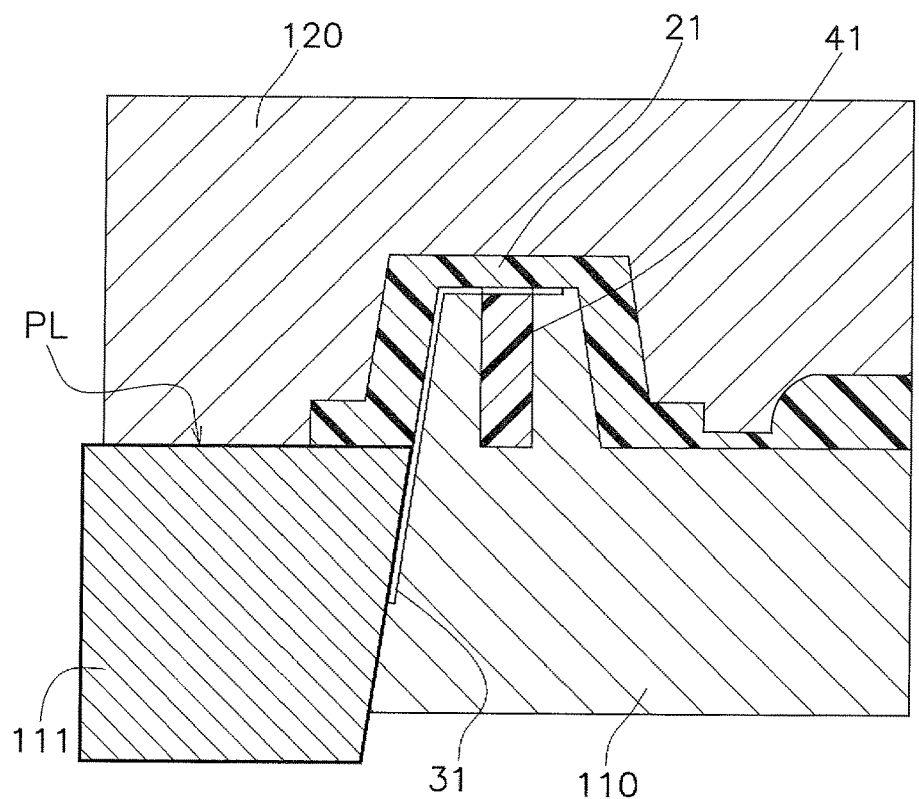
FIG. 12 is a schematic cross-sectional view illustrating second injection molding using a first model and a second model.
Figure 13:
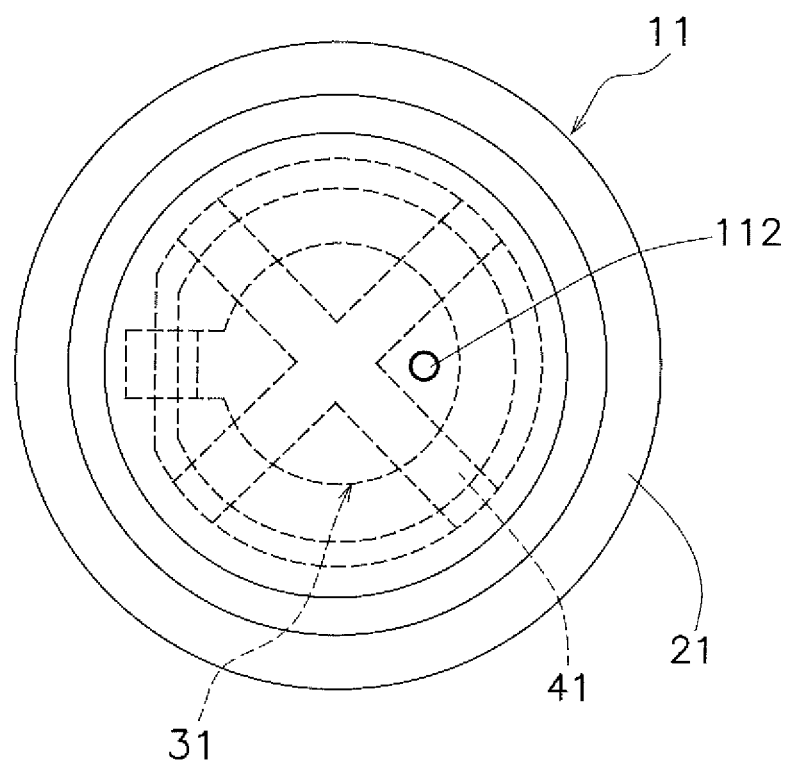
FIG. 13 is a plan view illustrating a positional relationship between a core pin and a first switch cap.
Figure 14:
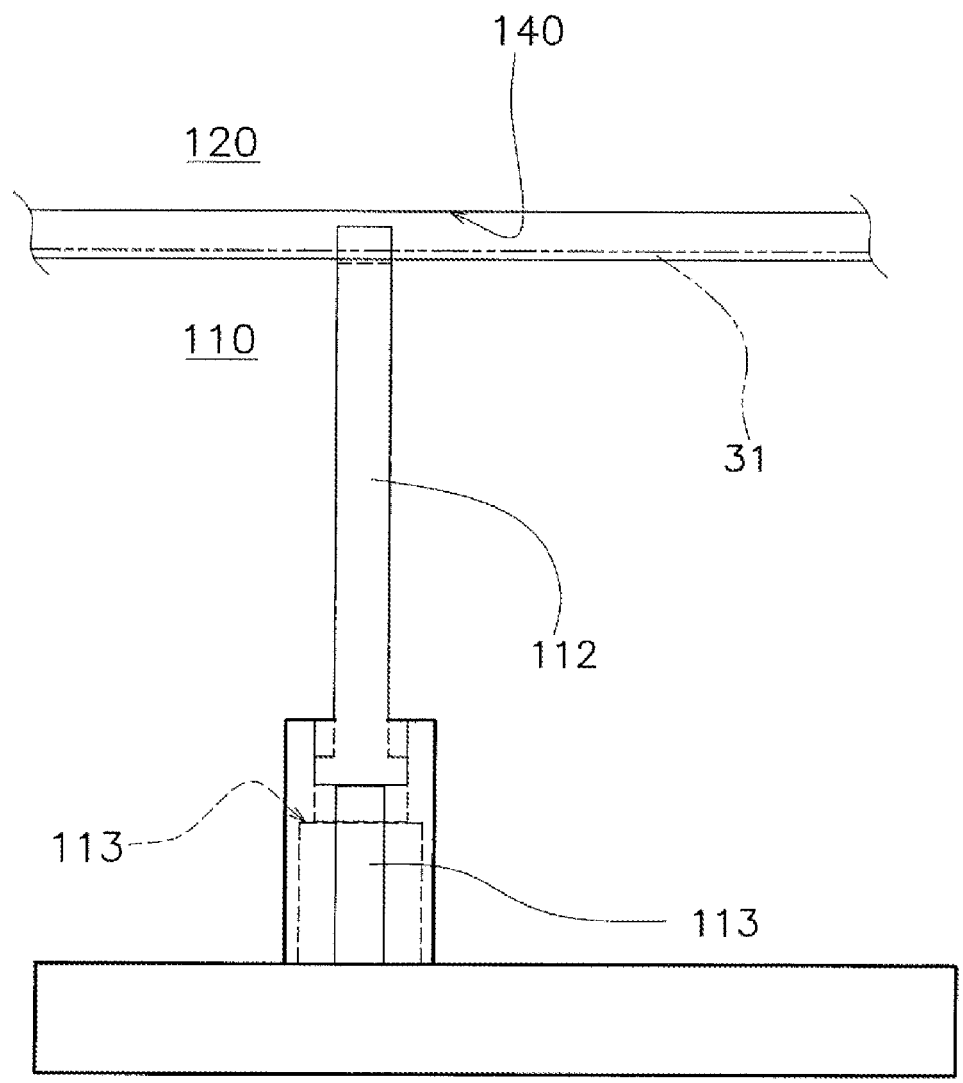
FIG. 14 is a schematic view illustrating operations of the core pin.

Next, the second model 120 is clamped in the first model 110, and the first cap main body 21 is molded by the second injection molding. FIG. 12 illustrates a cross-section of the first cap main body 21 and the first transmission member 41 when cut in the direction of the line II-II in FIG. 6. At this time, a secondary molding resin is injected into a cavity formed by the first model 110 and the second model 120 by using a side gate. In FIG. 12, a parting line PL is positioned on the lower surfaces of the first cap main body 21 and the first transmission member 41.

A core pin 112 for fixing the FPC 31 to the first model 110 is installed. The core pin 112 is set such that a tip end thereof is in the cavity 140 formed by the first model 110 and the second model 120. A gap is provided between the tip end of the core pin 112 and the second model 120. After a resin is injected into the cavity 140, a spring 113 that is biased to the core pin 112 contracts to the position of a dashed line so as to be flush with a core surface of the first model 110. The FPC 31 is fixed by such a core pin 112, and the first abutting portion 21a is formed in contact with the FPC 31.

In the first switch cap 11 formed in this manner, the FPC 31 is adhered to the first cap main body 21. For this reason, the FPC 31 may be provided with an adhesive layer at a location in contact with the first cap main body 21.

(4) Modification Examples (4-1) Modification Example A

Figure 15:
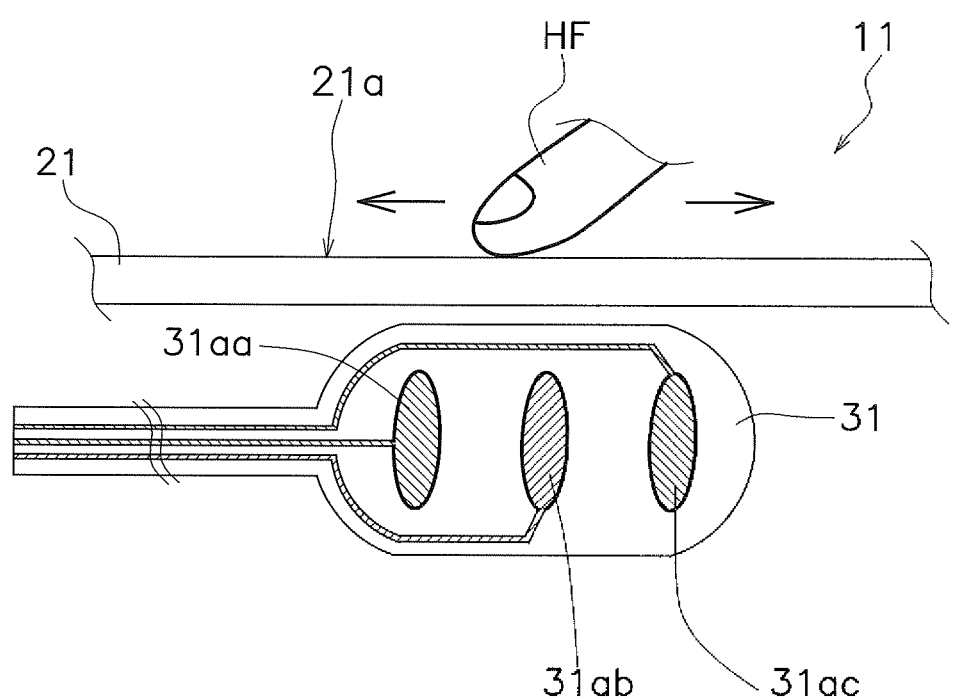
FIG. 15 is a schematic view illustrating an example in which a plurality of first sensors are disposed on one FPC.

In the above-described embodiment, for example, a case where one first sensor 31a is disposed in one first switch cap 11 has been described. However, the number of sensors disposed in one first switch cap 11 is not limited to one. For example, as illustrated in FIG. 15, three capacitance sensors, that is, a first capacitance sensor 31aa, a second capacitance sensor 31ab, and a third capacitance sensor 31ac are disposed as first sensors in one FPC 31 used in one sensor cap.

In this manner, by disposing, for example, a plurality of capacitance sensors along an abutting portion, it is possible to detect the direction of movement of sliding the finger HF along the abutting portion. For example, it is possible to detect whether the finger HF is moving from the first capacitance sensor 31aa toward the right second capacitance sensor 31ab and the third capacitance sensor 31ac or is moving from the third capacitance sensor 31ac toward the left second capacitance sensor 31ab and the first capacitance sensor 31aa. In this case, the type of switching can be indicated in accordance with a direction in which the finger HF moves. For example, in a case where two wipers are provided on the right and left sides of a windscreen of the automobile, it is possible to make settings in which the finger HF is slid rightward and then presses the switch cap to be able to operate the wiper on the right side, and the finger HF is slid leftward and then presses the switch cap to be able to operate the wiper on the left side. In addition, it is possible to give an instruction for operating both the wipers by pressing the switch cap with the finger HF stationary. The notification unit 80 gives a notification of a difference between the three types of instructions, for example, by turning on a white light-emitting diode when both the wipers operated, turning on a red light-emitting diode when the right wiper is made to emit light, and turning on a blue light-emitting diode when the left wiper is made to emit light. Note that, in the example illustrated in FIG. 15, a case where three capacitance sensors are used has been described, but it is only required that at least two capacitance sensors may be provided in a case where a direction is detected.

(4-2) Modification Example B

Figure 16:
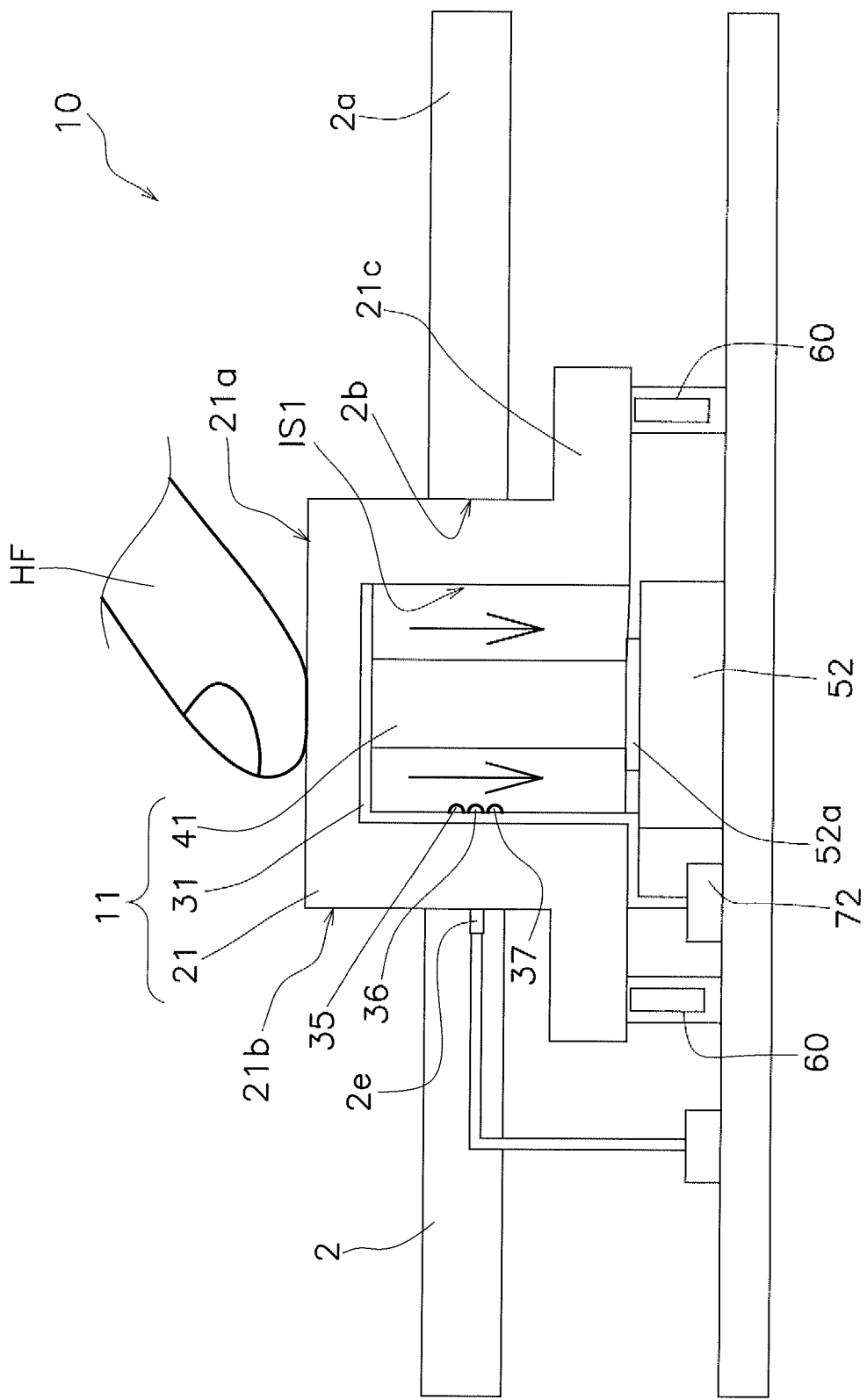
FIG. 16 is a schematic cross-sectional view illustrating a configuration of a first switch cap according to Modification Example B.

In the switch device 10 illustrated in FIG. 16, a plurality of capacitance sensors 35, 36, and 37 for movement detection are disposed along the body 21b of the first switch cap 11. In addition, for example, a small conductor 2e, which is grounded, is disposed in the support portion 2. In addition, the capacitance sensors 35, 36, and 37 for movement detection may be configured to detect a moving speed or a movement distance of the first switch cap 11 from a change in electrostatic capacitance caused when crossing the vicinity of the conductor 2e. In the controller 90, the first detection signal is received three times in total, once from each of the three capacitance sensors 35, 36, and 37 for movement detection from a state where the first switch cap 11 is not pressed by the finger HF to a state where the first switch cap 11 is pressed. The controller 90 can obtain the moving speed of the first switch cap 11 from a period of time required to receive the first detection signal three times. In addition, for example, when the controller 90 receives the first detection signal only once, the controller 90 can determine that the first switch cap 11 has not yet been pressed to the location of the second capacitance sensor 36. In other words, the controller 90 can detect the movement distance of the first switch cap 11 from the number of first detection signals to be received.

(4-3) Modification Example C

In the embodiment described above, a case where the switch unit 50 is constituted by the tact switches 51 to 54 has been described, but the switch constituting the switch unit is not limited to the tact switch. The switch constituting the switch unit 50 may be, for example, a membrane switch, a rotary switch, or a paddle switch (a rocker switch). For example, the rotary switch adjusts the sound volume of an acoustic device in an analog manner, and thus a sensor that detects abutting or approach of a finger may be disposed on a cylindrical inner surface of a body of a cylindrical cap in a configuration in which the rotary switch rotates with the body of the cylindrical cap. Further, in a case where there are two locations to press as in a paddle switch, two sensors that detect abutting or approach of a finger may be disposed at two locations. For example, in a case where switching between turn-on and turn-off is performed in the paddle switch, it is possible to reduce an error of switching between turn-on and turn-off by detecting whether the finger is abutting on the side of turn-on or the side of turn-off by the sensors.

(4-4) Modification Example D

In the embodiment described above, as illustrated in FIG. 12, for example, a case where the first cap main body 21 is formed of a secondary molding resin through second injection molding has been described. However, a transfer layer or a decorative sheet may be provided on the surface of the first cap main body 21. Decoration for the transfer layer or the decorative sheet can be performed simultaneously with injection molding of the secondary molding resin by simultaneous molding and decoration of the related art. In addition, the decoration may be performed using printing and other techniques, and for example, spray printing and laser etching can also be used.

(4-5) Modification Example E

Two FPCs formed separately are used in the FPCs 31 and 32 illustrated in FIG. 2. However, the FPCs 31 and 32 may be integrated into one FPC. The FPCs 31 and 32 are integrated into one, and thus manufacturing labor and manufacturing costs can be reduced.

(4-6) Modification Example F

In the embodiment described above, for example, description has been given of a case where the first sensor 31a, which is a capacitance sensor, is mounted on the FPC 31 in the first cap main body 21. However, a device that is mounted on the FPC 31 and provided in the first cap main body 21 is not limited to the capacitance sensor. The device that is mounted on the FPC and provided in the cap main body may be a proximity sensor, a light-emitting diode, an antenna, a heater, or a combination thereof.

(4-7) Modification Example G

In the embodiment described above, description has been given of a case where the FPC 31 is set in the recessed portion 41a of the first transmission member 41 which is a predetermined location for the first model 110 after the first injection molding in a case where a switch cap is molded by two-color molding. However, a method of manufacturing a switch cap by two-color molding is not limited to the example of the above-described embodiment. For example, the first model 110 and the third model 130 may be clamped to set the FPC 31 at a predetermined location of the first model 110 prior to the first injection molding. In this case, the FPC 31 is set in the first model 110 or the third model 130, which is a primary mold, in a state where the first model 110 and the third model 130 are open. In addition, the FPC 31 is bonded to the first transmission member 41 at the same time when the first transmission member 41 is molded. An insert molding method of the related art can be used for such molding. The first switch cap 11 molded in this manner can bond the FPC 31 to both the first cap main body 21 and the first transmission member 41 at the same time when molding is performed.

(4-8) Modification Example H

In the embodiment described above, description has been given of a case where the first sensor 31a to the fourth sensor 34a are used for sensing regarding which one of the first switch cap 11 to the fourth switch cap 14 is to be selected. However, the first sensor 31a to the fourth sensor 34a may be used for different types of switching from the switching of the tact switches 51 to 54.

For example, the switch device 10 can also be used to realize temporary (momentary) and maintenance (lock) by one button. For example, in the usage, the wiper is driven only when the first switch cap 11 is touched, and when the first switch cap 11 is pressed until the tact switch 51 is inserted, the wiper is continuously driven even when the first switch cap 11 is not touched.

For example, the controller 90 is programmed to be able to detect long-pressing, double-touch, and touch of the first switch cap 11 to the fourth switch cap 14 from changes of the first detection signal to the fourth detection signal of the first sensor 31a to the fourth sensor 34a. When such a configuration, a total of six types of operations obtained by combining a first switching operation through pressing with three types of second switching operations, that is, touch, double-touch, and long-pressing for each of the first switch cap 11 to the fourth switch cap 14 can be performed only by one switch cap. In addition, as described in FIG. 15, in a case where one first switch cap 11 includes a plurality of sensors (the first capacitance sensor 31aa, the second capacitance sensor 31ab, and the third capacitance sensor 31ac), a total of eight operations obtained by combining a pressing operation of the first cap main body 21 (first switching performed by the first tact switch 51) with four types of second switching operations, that is, touch, double-touch, long-pressing, and sliding can be performed only by one switch cap.

(4-9) Modification Example I

Figure 17:
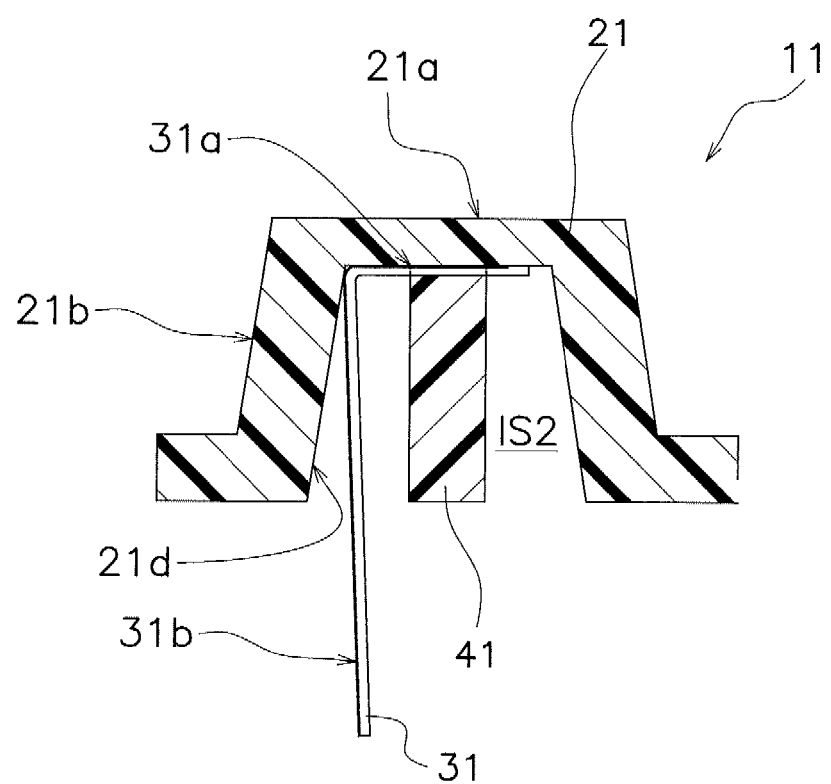
FIG. 17 is a schematic cross-sectional view illustrating a configuration of a first switch cap according to Modification Example I.

In the embodiment described above, as illustrated in FIGS. 4 and 5, for example, a case where the lead portion 31b of the FPC 31 is bonded and fixed to the inner surface 21d of the body 21b of the first cap main body 21 has been described as an example. However, the lead portion of the FPC may not be bonded to the inner surface of the body of the cap main body. For example, as illustrated in FIG. 17, the lead portion 31b of the FPC 31 may not be bonded to the inner surface 21d of the body 21b of the first switch cap 11. As illustrated in FIG. 17, in a case where the lead portion 31b of the FPC 31 is not bonded to the inner surface 21d, the lead portion 31b moves freely in the cap inner space IS2, which makes it easy to cope with a change in the position of the connector 71.

(5) Features 5-1

As illustrated in FIG. 9 to FIG. 12, for example, description has been given of an example of two-color molding including first injection molding (see FIG. 9) for molding the first transmission member 41 and second injection molding (see FIG. 12) for molding the first cap main body 21 in a case where the first switch cap 11 is manufactured. In such two-color molding, the FPC 31 is sandwiched between the first cap main body 21 and the first transmission member 41. Thereby, it is possible to reduce labor such as assembling for attaching the first sensor 31a to the inside of the first cap main body 21. The assembling of the first switch cap 11 is generally terminated at a point in time when the two-color molding is terminated, and the workability of assembling the switch device 10 can be improved.

FIG. 1 illustrates an example in which the first switch cap 11 to the fourth switch cap 14 are disposed on the same line side by side. Since the first switch cap 11 to the fourth switch cap 14 are separated from each other, it is possible to freely change a layout such as arranging in a zigzag pattern at a relatively large distance as compared to a case where key arrangement is performed only in a sheet using a sheet as disclosed in PTL 1, thereby improving the degree of freedom of arrangement.

In addition, since it is only required that the first sensor 31a to the fourth sensor 34a of the first switch cap 11 to the fourth switch cap 14 are connected to the connector 71, for example, as in the FPC 31 of the first switch cap 11 illustrated in FIG. 2, and thus the connection of the first sensor 31a to the fourth sensor 34a to the controller 90 is facilitated. As a result, it is possible to improve workability at the time of assembling the first switch cap 11 to the fourth switch cap 14 to the switch device 10.

5-2

As illustrated in FIG. 4, for example, in the first switch cap 11, the light-emitting diode 81, which is a light-emitting component that emits light indicating the first cap main body 21, is attached to the FPC 31. For example, the first switch cap 11 can easily associate the detection of abutting or approach of an operator to the first abutting portion with light emission of the light-emitting component, thereby making it easier to construct a configuration for reducing a pressing error of a switch.

5-3

The first switch cap 11 illustrated in FIG. 15 is configured to include at least the first capacitance sensor 31aa and the second capacitance sensor 31ab that are disposed side by side along the first abutting portion 21a, for example, as first sensors disposed in one first switch caps 11 and can detect a moving direction of the finger HF which is an operator. In the case of the switch device 10 including such a first switch cap 11, for example, the first switching can be performed in consideration of the moving direction of the finger HF, thereby making it easier to increase variations of switching.

5-4

The switch device 10 illustrated in FIG. 7 can utilize, for example, the detection of abutting or approach of the finger HF to the first abutting portion 21a and the second abutting portion 22a by the first sensor 31a and the second sensor 32a. For this reason, the switch device 10 can reduce pressing errors of the first switch cap 11 and the second switch cap 12 such as pressing the second switch cap 12 when attempting to press the first switch cap 11.

5-5

In the switch device 10 illustrated in FIG. 7, as described in the flowchart of FIG. 8, the first switching and the second switching are not performed under the control of the controller 90, for example, even when the first cap main body 21 and the second cap main body 22 are pressed to be moved before a notification is given by the notification unit 80 (for example, before step ST5), and thus it is possible to prevent errors of the first switching and the second switching.

5-6

In the switch device 10 illustrated in FIG. 16, the first switch cap 11 is fitted into the support portion 2, which is the housing of the switch device 10. The support portion 2 and the first switch cap 11 are provided with the conductor 2e and the capacitance sensors 35, 36, and 37 for movement detection as operation detection sensors that detect a moving speed or a movement distance of the first cap main body 21. The controller 90 is connected to the first sensor 31a, which is a sensor for an operator, and the operation detection sensors, and the detection of a moving speed or a movement distance of the first cap main body 21 is performed at the time of the switching of the switch unit 50, at the same time as the detection of abutting or approach of the finger HF, which is an operator, to the first abutting portion 21a. The switch device 10 configured in this manner can increase variations of the first switching by using at least one of the moving speed and movement distance of the first cap main body 21.

5-7

For example, as illustrated in FIG. 3, in the switch device described in Modification Example H, the first switch cap 11 is fitted into the support portion 2, which is the housing of the switch device 10. In addition, as illustrated in FIG. 6, the switch unit 50 of the switch device 10 is connected to the controller 90 in order to perform the first switching in accordance with the movement of the first switch cap 11. The first switch cap 11 includes the first abutting portion 21a that the finger HF, which is an operator, abuts for the first switching. The three-dimensional first cap main body 21 moves by a force applied to the first abutting portion 21a from the finger HF. The first sensor 31a or the first capacitance sensor 31aa to the third capacitance sensor 31ac are disposed in the first cap main body 21 and detect abutting or approach of the finger HF to the first abutting portion 21a. The controller 90 is connected to the first sensor 31a or the first capacitance sensor 31aa to the third capacitance sensor 31ac and performs second switching different from the first switching by abutting or approach of the finger HF to the first abutting portion 21a. The switch device 10 configured in this manner can combine the first switching and the second switching to increase variations of switching.

Although the embodiments and the modification examples of the present invention have been described above, the present invention is not limited to the above-described embodiments and modification examples, and various changes are possible without departing from the gist of the invention. In particular, the plurality of embodiments and modification examples described herein can be combined arbitrarily with one another as necessary.

REFERENCE CHARACTER LIST

2 Support portion (example of housing)
2e conductor
10 Switch device
11 First switch cap
12 Second switch cap
13 Third switch cap
14 Fourth switch cap
21 First cap main body
21a First abutting portion
22 Second cap main body
22a Second abutting portion
31, 32, 33, 34 Flexible printed circuit board (FPC)
31a First sensor
31aa First capacitance sensor
31ab Second capacitance sensor
32a Second sensor
35, 36, 37 Capacitance sensor for movement detection
41 First transmission member 42 Second transmission member
50 Switch unit
80 Notification unit
90 Controller
110 First model
120 Second model

The invention claimed is:

1. A method of manufacturing a switch cap attached to a switch device that performs predetermined switching, the method comprising:
   a step (a) of molding a transmission member by first injection molding using a first model, the transmission member moving together with a three-dimensional cap main body for the switching to transmit the movement of the cap main body to a predetermined location of the switch device;
   a step (b) of molding a second model into the first model to perform second injection molding, and molding the cap main body having an abutting portion that an operator abuts for the switching and moving by a force applied to the abutting portion from the operator;
   a step (c) of setting a flexible printed circuit board at a predetermined location of the first model before the step (a) or before the step (b), the flexible printed circuit board including a sensor that detects abutting or approach of the operator to the abutting portion; and
   fixing the flexible printed circuit board by the cap main body and the transmission member so that the sensor is disposed at a predetermined location of the abutting portion by the step (a), the step (b), and the step (c).

2. A switch device comprising:
   a housing;
   a first switch cap fitted into the housing;
   a switch unit performing a first switching in accordance with movement of the first switch cap; and
   a controller connected to the switch unit, wherein
   the first switch cap includes a first abutting portion that an operator abuts for the first switching, and includes a three-dimensional first cap main body that moves by a force applied to the first abutting portion from the operator, a first sensor that is disposed in the first cap main body and detects abutting or approach of the operator to the first abutting portion, and a transmission member that is fixed to an inside of the cap main body and moves together with the first cap main body for the first switching to transmit the movement of the cap main body to a predetermined location of the switch unit,
   the housing and the first switch cap are provided with an operation detection sensor detecting a moving speed or a movement distance of the first cap main body, and
   the controller is connected to the first sensor and the operation detection sensor, and performs the detection of abutting or approach of the operator to the first abutting portion and the detection of the moving speed or the movement distance of the first cap main body when the first switching of the switch unit is performed.

3. The switch device according to claim 2, wherein
   the switch device further includes a second switch cap,
   the switch unit performs a second switching in accordance with movement of the second switch cap, and
   the second switch cap includes a three-dimensional second cap main body having a second abutting portion that the operator abuts for the second switching, and a second sensor disposed in the second cap main body.

4. The switch device according to claim 3, wherein
   the first switch cap includes a first transmission member that moves together with the first cap main body for the first switching to transmit the movement of the first cap main body to a predetermined location of the switch unit,
   the second switch cap includes a second transmission member that moves together with the second cap main body for the second switching to transmit the movement of the second cap main body to the predetermined location of the switch unit, and
   the controller causes the switch unit to perform the first switching by the first transmission member transmitting the movement of the first cap main body to the predetermined location of the switch unit after the notification given by the notification unit when the operator has abutted or approached the first abutting portion, causes the switch unit to perform the second switching by the second transmission member transmitting the movement of the second cap main body to the predetermined location of the switch unit after the notification given by the notification unit when the operator has abutted or approached the second abutting portion, and causes the switch unit not to perform the first switching and the second switching even when the first transmission member and the second transmission member transmit the movement of the first cap main body and the second cap main body to the predetermined location of the switch unit before the notification given by the notification unit.

5. The switch device according to claim 3, wherein
   the first cap main body and second cap main body are configured to respectively move by forces applied to the first abutting portion and the second abutting portion from the operator.

6. The switch device according to claim 3, wherein
   the first sensor and the second sensor respectively transmit a first detection signal and a second detection signal related to detection of abutting or approach of the operator to the first abutting portion and the second abutting portion to the controller.

7. The switch device according to claim 3, wherein
   the switch device further comprises a notification unit configured to give a notification of states of the first switch cap and the second switch cap by using light, vibration, or sound, and
   the controller causes the notification unit to give a notification of which one of the first abutting portion and the second abutting portion the operator is abutting or approaching by a distinguishable light color or blinking, a difference in vibration, or a difference in sound, based on the first detection signal and the second detection signal.

8. The switch device according to claim 2, wherein
   the controller is connected to the sensors and performs second switching different from the first switching by the abutting or approach of the operator to the first abutting portion.

9. The switch device according to claim 8, wherein
   the controller receives a detection signal indicating the abutting or approach of the operator to the first abutting portion by the second switching,
   the controller stops the first switching at a timing when the detection signal has been received, and
   the controller allows switching of the first switching when a predetermined period of time elapses from the timing at when the detection signal has been received.

* * * * *